Patented May 26, 1953

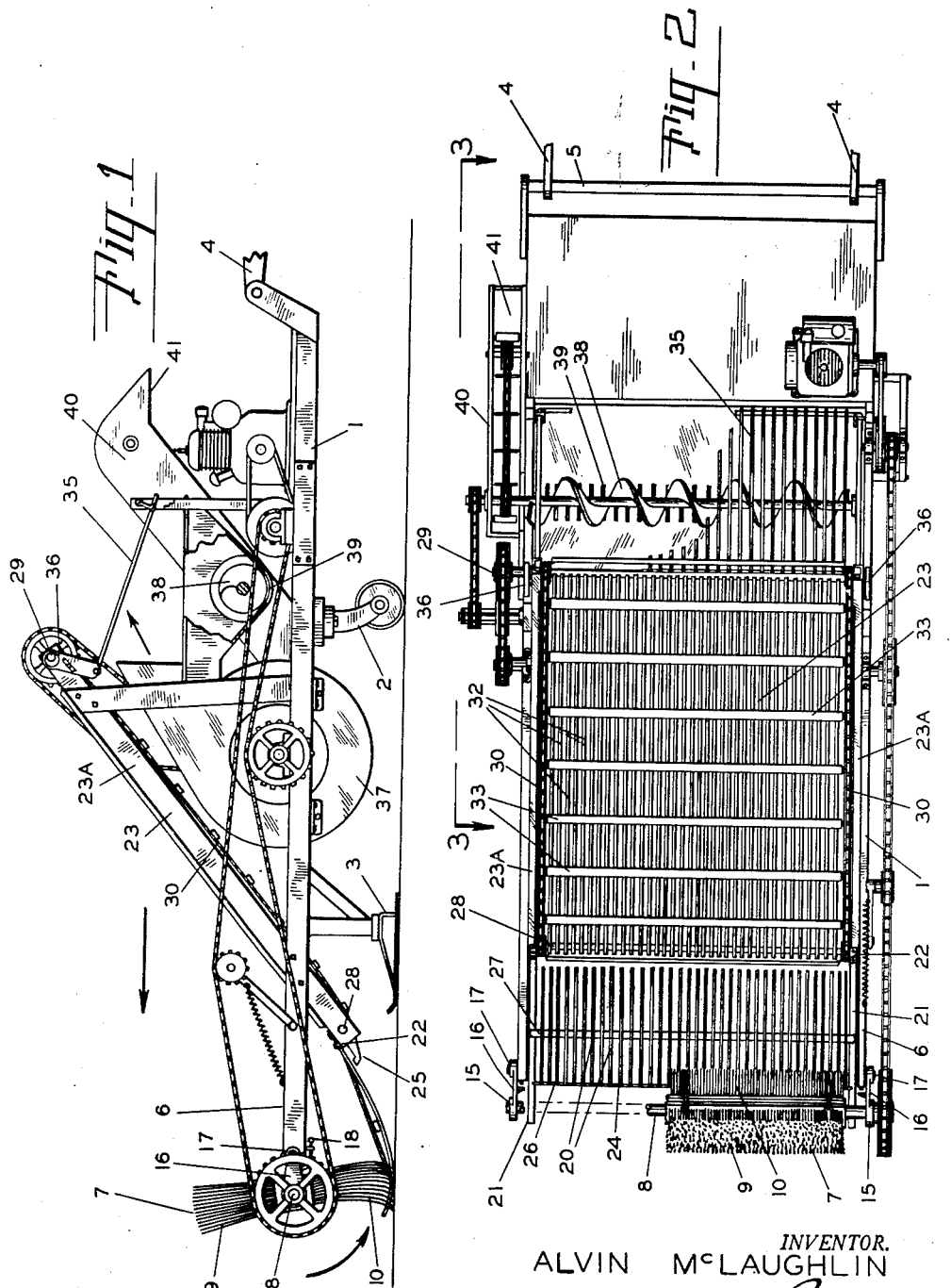

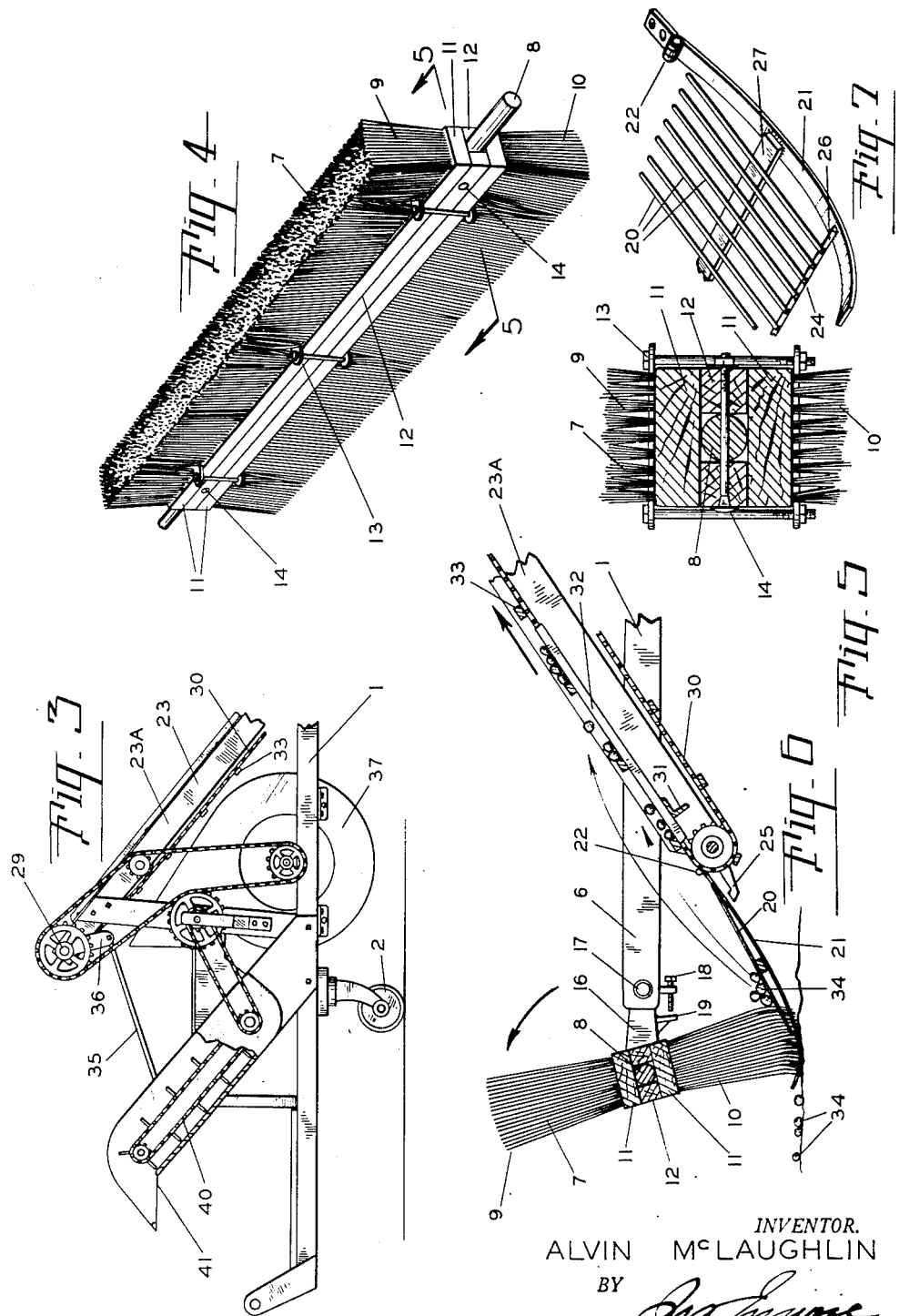

2,639,573

UNITED STATES PATENT OFFICE 2,639,573

NUT HARVESTING MACHINE

Alvin McLaughlin, Woodburn, Oreg.

Application May 8, 1950, Serial No. 160,763

3 Claims. (Cl. 56—328)

1

This invention relates to nut picking machines and is particularly adapted for the picking of filberts and the like.

The primary object of my invention is the provision of a special rotating broom for the gathering of the nuts and delivering them into the cleaning mechanism of the harvester.

I have found that a rotating broom, having groups of bristles spaced apart from one another upon a rotor will give the best results in the sweeping of the nuts from the ground surface on to an inclined conveyor. With this type of broom the nuts are swept off the ground by an intermittent sweeping action, throwing the nuts up on to the conveyor.

Heretofore where brooms had their bristles completely around the rotor this throwing action could not take place due to the fact there was always a continuous contact between the bristles and the ground surface preventing any throwing action being imparted to the nuts.

A further object of my invention is to provide means of causing the brush to float along the surface of the ground in its operation.

These and other incidental objects will be apparent in the drawings, specification and claims.

Referring to the drawings:

Figure 1 is a side elevation of my new and improved nut harvester, parts broken away for convenience of illustration.

Figure 2 is a plan view of Figure 1, parts broken away for convenience of illustration.

Figure 3 is a fragmentary side view, taken on line 3—3 of Figure 2, parts broken away for convenience of illustration.

Figure 4 is a perspective view on an enlarged scale of my new and improved brush assembly.

Figure 5 is a sectional end view on an enlarged scale, taken on line 5—5 of Figure 4.

Figure 6 is an illustration of the brush action in the gathering of the nuts.

Figure 7 is a fragmentary perspective view on an enlarged scale of the gathering tines or fingers.

Referring more specifically to the drawings:

My new and improved nut harvester consists of a frame 1, mounted upon caster wheels 2 and runners 3. The machine is connected to a tractor by way of the arms 4, which are pivotally mounted to the said frame 1 by the cross member 5. The arms 4 form part of the tractor and are presumed to be operated by hydraulic means for raising and lowering. In the event the arms are forced down by the tractor mechanism it will raise the forward end 6 of the frame 1, lifting the shoes 3 off the ground so that the machine

2 can be turned about by the tractor on the caster wheels 2.

The primary feature of my invention is not in the overall machine, but in the brush structure. I have merely illustrated the overall machine in order to illustrate the operation of my brush.

The brush unit 7 consists of two separate oppositely disposed brushes 9 and 10 mounted on a shaft 8, each brush including a flat head 11 and bristles extending therefrom. The heads 11 of the brushes are disposed on opposite sides of the shaft, and spacer bars 12 are interposed between the heads on opposite sides of the shaft, as best illustrated in Figure 5. Clamps 13 retain the heads against the shaft, each clamp comprising bars which extend across the flat heads, with bolts 14 extending through the ends of the bars to bind the heads and the spacer bars to the shaft.

The shaft 8 is journalled within bearings 15 associated with the arms 16, which are pivotally mounted to the frame 1 at 17. I have provided an adjustment for raising or lowering the working operation of the broom, which consists of an adjusting screw 18 providing a stop against which the arm 19 of the arms 16 limits the downward movement of the broom assembly.

Pick up tines or fingers 20 are supported upon the shoes 21, which are hingedly secured at 22 to the inclined elevator 23 of the machine. This permits the forward ends 24 of the said tines or fingers to raise and lower over the contour of the ground surface. The downward movement of the tines are limited by the stop 25 when the forward end of the machine is raised in turning operations. Cross members 26 and 27 secure the tines 20 to the shoes 21 by any suitable means, as for instance welding.

A special inclined conveyor 23 is supported on the frame 1, as best illustrated in Figure 1. This conveyor consists of cross shafts 28 and 29, having chains 30 trained about sprockets mounted to the said cross shafts. Cross members 31 space the side rails 23A apart and have spaced rails 32 mounted thereon running longitudinally of the conveyor 23.

Mounted between the chains 30 are cross bars 33 which operate over the surface of the bars 32. The object of the spaced bars 32 are to allow the clods of dirt to be broken up and pass therethrough, separating the same from the nuts being conveyed over said bars and upwardly on the conveyor.

In the operation of the machine, the brush 7 is revolved in the direction of the arrow, brushing the nuts 34 up on to the tines or fingers 20 and even throwing them beyond as indicated by the arrows, Figure 6, on to the conveyor 23. Any clods of dirt will be thrown so forcefully on to the conveyor that they will be broken up on landing on the bars 32. The leaves and lighter material travelling up the conveyor with the nuts and being delivered on to the screening bars 35. These bars are oscillated by the eccentric mechanism 36 from the shaft 29.

A blower 37 is mounted within the machine and is adapted to separate the lighter materials from the nuts as they pass over the bars 35 or on passing therethrough on the way to the screw conveyor 38. Under the screw conveyor 38 are slots 39 through which the fine dirt may escape. The screw conveyor delivers the nuts into the elevator 40 from where they are delivered at the point 41 into sacks.

As stated above, I am not so interested in this application in the mechanism described beyond the inclined conveyor 23, but have only illustrated the same to carry out a complete operation, as the invention really resides in the intermittent contact of the brushes 9 and 10 with the ground surface brushing the nuts on to the tines 20 and the conveyor bars 32 by way of a throwing action. This is accomplished by the fact that the brushes 9 and 10 are oppositely disposed to one another and spaced apart.

I do not wish to be limited to two brushes, as a battery of one or more may be used, just so long as there is a space provided between the brushes themselves allowing the brushes to flex, permitting them to throw the nuts on leaving the ground surface.

I have found that where continuous bristles are used in a brush completely around the same, this throwing action does not exist in a sufficient amount to carry out the object of my invention, which is to throw the nuts from the ground through the air on to the tines and elevator bars thereby breaking up any clods of dirt that may exist, and at the same time more thoroughly cleaning the nuts from the ground surface.

Although certain specific embodiments of the invention have been shown and described, it is obvious that many modifications thereof are possible. The invention, therefore, is not to be restricted except in so far as is necessitated by the prior art and by the spirit of the appended claims.

What I claim is:

1. Means for brushing up nuts from the ground comprising a frame, brackets pivoted to the frame and extending therefrom, a shaft mounted in the brackets, diametrically disposed brushes, each brush having a flat head from which bristles extend, the heads of the oppositely disposed brushes fitting snugly against opposite surfaces of the shaft, spacer bars equal in thickness to the diameter of the shaft and fitted between opposite heads on opposite sides of the shaft, clamps binding the heads of the brushes and the spacer bars to the shaft, pins extending through the spacer bars and the shaft, means between the frame and the brackets for tilting the brushes to regulate surface contact of the ends of the bristles with the ground in the rotation of the brushes, and a series of spaced-apart tines extending downwardly from the frame to receive nuts swept up by the brushes, the free ends of the tines being in the path of rotation of the outer ends of the bristles.

2. Means for picking up nuts from the ground as defined in claim 1, wherein each clamp consists of plates which extend across the heads, and screws connecting the plates to draw them together.

3. A brush for a nut gathering machine, comprising a shaft, diametrically disposed brushes mounted on the shaft, each brush including a head and bristles extending from the head, spacer bars interposed between the adjacent heads each side the shaft, the thickness of the spacer bars approximately equalling the diameter of the shaft, spaced-apart clamps binding the heads of the brushes, the spacer bars and shaft together, and means engaging the spacer bars and shaft to lock said bars to the shaft.

ALVIN McLAUGHLIN.

References Cited in the file of this patent

UNITED STATES PATENTS

| Number | Name | Date |
|---|---|---|
| 2,065,169 | Carpenter | Dec. 22, 1936 |
| 2,205,249 | Fitzgerald et al. | June 18, 1940 |
| 2,441,244 | Kimball | May 11, 1948 |

FOREIGN PATENTS

| Number | Country | Date |
|---|---|---|
| 13,720 | Great Britain | Aug. 14, 1851 |